INVENTORS
MARTEN MARTENSSON
BY THEODORE J. LUND
ATTORNEYS

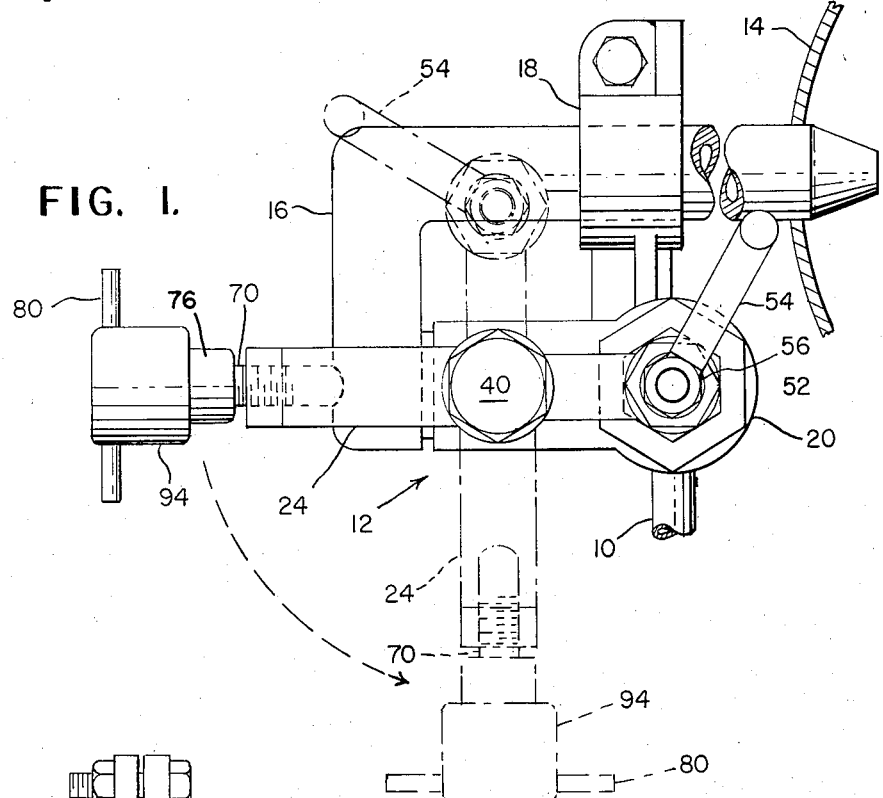
FIG. 1.
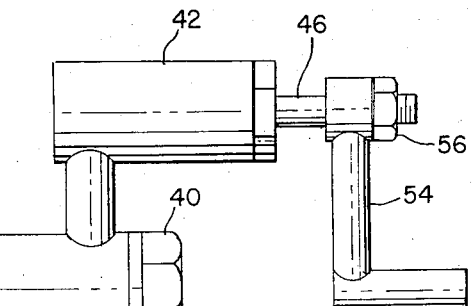
FIG. 2.
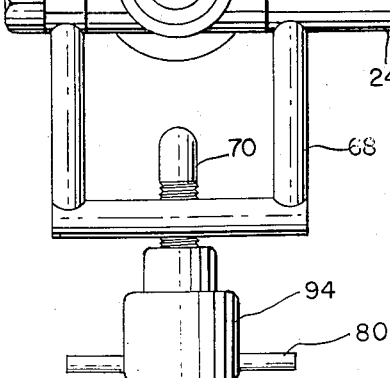
INVENTORS
MARTEN MARTENSSON
BY THEODORE J. LUND
ATTORNEYS March 10, 1959 M. MARTENSSON ET AL 2,876,983
SAFETY SHUTOFF COUPLING Filed Sept. 27. 1954 2 Sheets-Sheet 2

2,876,983

SAFETY SHUTOFF COUPLING

Marten Martensson, Washington, D. C., and Theodore J. Lund, Hyattsville, Md.

Application September 27, 1954, Serial No. 458,722

4 Claims. (Cl. 251—151)

(Granted under Title 35, U. S. Code (1952), sec. 266)

The invention described herein may be manufactured and used by or for the Government of the United States of America for governmental purposes without the payment of any royalties thereon or therefor.

This invention relates to a fuel oil burner safety device and more particularly to a safety shutoff coupling used in a pressurized fuel system wherein fuel is either permitted or prevented from flowing therethrough according to a preselected position of the coupling in the apparatus.

The fuel oil piping installations utilized on ships for providing preheated, high pressure oil to burners terminate in a plurality of end sections of pipe, or atomizers, which spray the fuel oil into the burner. The burner provides heat for generating steam which ultimately is used for driving turbines on the ship.

An unusual characteristic of this type fuel system is that when there is a major demand for a change in the ship's speed, the atomizers for each burner must be changed to supply a corresponding amount of fuel to the burner thereby resulting in an increase or decrease in steam pressure for achieving the desired speed change. The design of the system is such that a valve in the fuel supply line must be turned to a closed position when atomizers of one size are changed for those of a different size, so as to preclude the spraying of hot, high pressure oil into the compartment housing the equipment.

The prior art discloses apparatus wherein an atomizer is held in place by a bolt and yoke arrangement, and a separately operative control valve is utilized for controlling the flow of fuel to the atomizer. The disadvantages of this type installation is that an atomizer may be removed accidentally while the control valve is open thereby permitting the hot oil to spray into the compartment with consequent destruction of equipment by fire and injury to personnel maintaining and operating such equipment. Further, in the event an atomizer is not in position, the control valve may be opened allowing flow of fuel into the compartment under full line pressure thereby causing the destruction described above.

It is therefore an object of the invention to provide a safety coupling for effectively eliminating the hazards now present in fuel supply systems.

Another object of the invention is to provide a safety device for preventing the removal of an end section of pipe, or atomizer, in a fuel supply line operating under high pressure.

Another object of the invention is the provision of a safety device having a clutch associated with a movable yoke for holding an atomizer in position and for preventing removal of the end section of pipe when fluid is flowing through the safety device.

A further object of the invention is the provision of a safety coupling in a fluid supply system having a fluid control valve and a pressure operative releasing device preferably mounted on the coupling for preventing release of an atomizer when the valve is in an open position.

A still further object of the invention is the provision of a safety coupling in a fluid supply system having a control valve operating lever interconnected with a pressure actuated bolt on the coupling for preventing opening of the control valve when an end section of pipe is not properly positioned in the system.

Other objects and many of the attendant advantages of this invention will be readily appreciated as the same becomes better understood, by reference to the following detailed description when considered in connection with the accompanying drawings wherein:

Fig. 1 is a side view in elevation of a fuel supply system for a burner including the safety shutoff coupling, the parts in solid lines illustrating the device in an operative position;

Fig. 2 is a front view in elevation of the apparatus showing the position of the parts when the atomizer is removed from the system;

Figure 3:
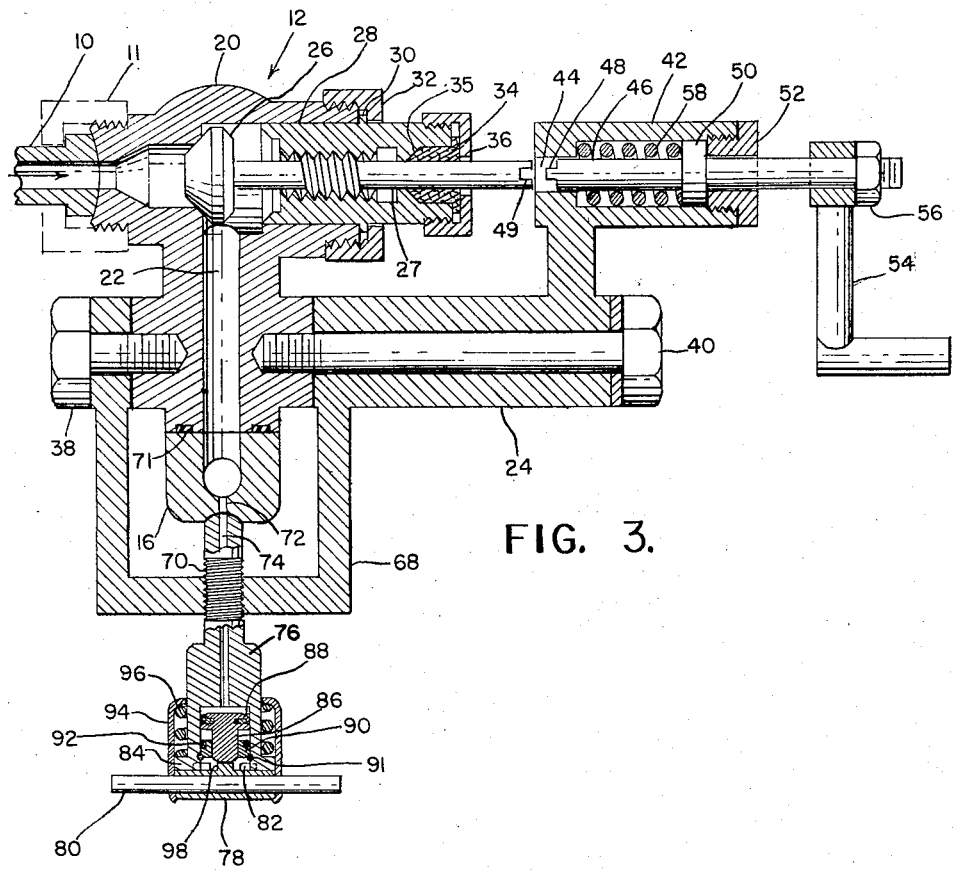
Fig. 3 is a cross-sectional view of the device in operative position showing the yoke and including details of the control valve and pressure operated bolt for holding an atomizer in position.

Referring now to the drawings wherein like reference characters designate like or corresponding parts throughout the several views, there is illustrated the general organization of the invention, the solid lines showing the device in an operative position while the dotted lines show an inoperative position of the parts. The apparatus comprises a fuel supply pipe 10 providing fuel to a safety shutoff coupling 12. Interconnected between coupling 12 and burner 14 is a removable atomizer 16 which is utilized for supplying fuel to the burner. The atomizer is supported in a bracket 18 and is removably attached to coupling 12 by an adjustable bolt in pivotally mounted yoke 24.

Referring now to Fig. 3, the safety shutoff coupling 12 includes a housing 20 having the fuel supply pipe 10 connected thereto by a cap 11. Integrally formed or bored within housing 20 is a passageway 22 controlled by a manually operated screw-type valve 26 affixed to an end of valve stem 27. The structure for positioning and operating valve 26 comprises a cylindrically shaped valve stem holder 28 having internal threads and being provided with a flange 30 adjacent the outer end thereof. Locking nut 32 engages flange 30 and is threadably attached to housing 20 for drawing the valve stem holder 28 into a permanent position within the housing. Appropriate packing glands 34 abuts an inwardly turned flange 35 for preventing leaking of oil past valve stem 27 to the exterior of housing 20. A packing gland nut 36, threadably attached to the outer end of holder 28, is available for tightening the packing glands as they become worn during normal operation of the device.

The one piece yoke 24, above referred to, is pivotally mounted on housing 20 by means of a pair of bolts 38 and 40. The end of one arm of the yoke is provided with a housing or holder 42 having an open end 44 which is adapted to rotate about bolts 38 and 40 as pivots into axial alignment with valve stem 27. Slidably mounted within housing 42 is a control valve handle 46 having a male lug 48 positioned on the outer end thereof for engaging slot 49 in the end of valve stem 27. Intermediate the ends of the handle 46 is an integral shoulder 50 providing a contact surface for spring 58 which biases the control valve handle to a disengaged position. Stop nut 52 holds control valve handle 46 in position while simultaneously adjusting the tension in spring 58. An operating arm 54 is attached to the outer end of handle 46 by lock nut 56. It will be noted that valve 26 can only be opened when the housing 42 or yoke 24 is in axial alignment with valve stem 27. With the parts so positioned, control valve handle 46 can be pressed inwardly against the action of spring 58 to permit engagement of slot 49 by lug 48 thereby providing a direct connection for valve operation.

The other end of yoke 24, comprising a U-shaped bracket 68, is provided with a threaded bolt 70 which is adapted to engage the outer end of atomizer 16 for holding the latter in fluid tight relationship with passageway 22 of housing 20. O-type seal rings 71 are provided for effecting a fluid tight joint between the housing 20 and atomizer 16. The bolt 70 has a central duct 74.

It is evident that hot, high pressure oil will spray past the O-seal ring 71 in the event bolt 70 is backed away from the gooseneck of atomizer 16. In order to preclude accidental operation of the bolt while the system is under pressure and operative, a clutch is attached to the bolt which is adapted for actuation only when there is an absence of pressure in the system. The clutch is known in the art as a "Wilson-Dunton Safety Bolt" and comprises a body 76 permanently affixed to bolt 70. A clutch jaw 78, positioned below the body 76 and having a handle 80 extending transversely therethrough, is provided with claws 82 for engaging mating slots formed in shoulder 84 of body 76. Mounted within body 76 is a movable piston 86 having piston seal rings 88 in the upper end thereof. Downward movement of the piston is limited by a piston stop 90, held in place by a snap ring 91 and being provided with a stop seal 92 circumferentially arranged around piston 86. A spring sleeve 94 encompasses the clutch jaw and serves to house spring 96 which biases the clutch jaw into an engaging position when there is an absence of oil pressure in the system.

It is apparent that handle 80 may be actuated to rotate bolt 70 when the clutch is in an engaged position. However, with valve 26 open and oil under high pressure flowing through passageway 22 to the atomizer, the oil pressure will be transmitted through duct 74 to the upper side of piston 86. The pressure in this area forces the piston downwardly where it engages member 98 and moves the clutch jaw 78, against the biasing action of spring 96, to a disengaged position. At this time, movement of handle 80 has no effect on the parts, and because of high oil pressure acting on the piston, it is impossible to manually force engagement of the clutch, thereby positively precluding operation of bolt 70.

In operation, the gooseneck portion of atomizer 16 is placed adjacent passageway 22 of housing 20 and yoke 24 raised to an operative position. Since valve 26 is closed and therefore no pressure acting on the system, the clutch jaw 78 of the clutch is engaged and the bolt 70 can be rotated against the atomizer to create a fluidtight joint with housing 20. Control valve handle 46 is then pressed inwardly into engagement with valve stem 27 and the valve 26 turned to an open position. Oil is then permitted to flow from inlet 10 through passageway 22 and atomizer 16 to the burner. The reverse of this procedure is utilized for changing atomizers. It will be noted that with valve 26 in the open position, valve stem 27 projects into opening 44 provided in housing 42 so that the valve must be turned to a closed position before yoke 24 is rotated away from an operative position.

The yoke 24 is balanced to hang in an inoperative vertical position when an atomizer is not installed in the system. This position is shown in Fig. 2 and by the broken lines of Fig. 1. This feature of the invention provides protection against the possibility of accidentally opening the valve since the operator is made aware that an atomizer is not in position.

Figure 4:
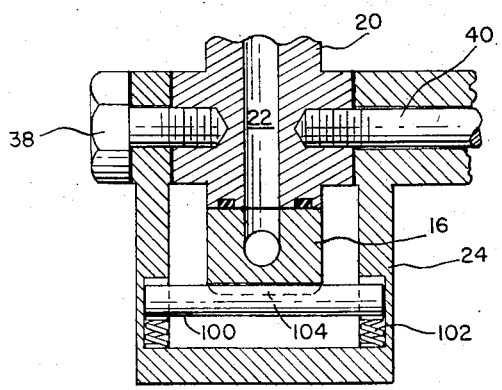
Fig. 4 is a cross-sectional view in elevation showing a modification of the pressure operated bolt for holding an atomizer in position.

Referring now to Fig. 4, an alternative means for holding atomizer 16 in position consists of a bar 100 positioned in the bottom end of the yoke and biased to an upward position by means of springs 102. With an atomizer in position, the yoke is swung upwardly behind the atomizer and bar 100 is caused to slide over the lower edge of the atomizer and engage a detent 104 provided therein for securely holding the atomizer 16 in fluidtight relationship with housing 20.

Obviously many modifications and variations of the present invention are possible in the light of the above teachings. It is therefore to be understood that within the scope of the appended claims the invention may be practiced otherwise than as specifically described.

What is claimed is:

1. A safety coupling device for connecting a fluid supplying member and a fluid receiving member, said coupling device comprising a housing member having a fluid passage extending therethrough, a fluid inlet opening provided in said housing in communication with said passage, and a fluid outlet opening provided in said housing also in communication with said passage, a valve means mounted in said housing for selectively opening and closing said fluid passage and a valve stem extending outwardly of said housing, a pivotally mounted yoke on said housing having valve actuating means fixedly attached to one arm thereof for pivotal movement therewith, said valve actuating means being adapted to selectively engage the valve stem for selectively opening the valve, a restraining member on said yoke adapted to lock said fluid receiving member in fluid tight relationship with said safety coupling device and in juxtaposed relation with said fluid outlet opening, said restraining member including a pressure sensitive means responsive to the pressure of fluid flowing through the coupling device for preventing removal of said restraining member when fluid is flowing through the coupling.

2. A safety coupling device for use in connecting a fluid supplying member and a fluid receiving member comprising, a valve housing having a fluid passage extending therethrough, a fluid inlet opening provided in said housing in communication with said fluid passage and a fluid outlet opening likewise in said housing and in communication with said fluid passage, valve means in said passage for selectively closing the same, a movable valve stem for said valve having a slotted edge on one end thereof, a yoke pivotally mounted on said housing and having a holder affixed to one arm thereof, said holder being adapted to be moved into alignment with said valve stem, valve actuating means in said holder for engaging said slotted edge of said valve stem for selectively opening and closing said valve, a locking member on said yoke selectively movable into and out of locking engagement with said fluid receiving member and adapted to lock said fluid receiving member in fluid tight relation with said housing in juxtaposed relation with said fluid outlet opening, said locking member including a pressure sensitive means, responsive to the pressure of fluid flowing through said coupling device, for preventing removal of said locking member when said valve is in open position.

3. A safety coupling device as set forth in claim 2 wherein said valve actuating means in said holder is in alignment with the slotted edge on the valve stem when said locking member is in locking engagement with said fluid receiving member.

4. A safety coupling device comprising a housing having a fluid passage extending therethrough, a fluid inlet opening and a fluid outlet opening formed in said housing, each of said openings being in communication with said fluid passage, a valve including a valve stem, for selectively opening and closing said fluid passage, a pivotally mounted yoke on said housing, said yoke comprising an arm having a holder fixedly mounted thereon and capable of being aligned with said valve stem, a valve stem actuating member in said holder having means on one end thereof for engaging said valve stem and being spring biased to a disengaged position, a locking device mounted on said yoke and adapted to clamp a fuel receiving member in fluid tight relation with said coupling housing in juxtaposed relation with said fluid outlet opening, and means on said locking device for preventing removal of the latter when fluid is flowing through said coupling.

References Cited in the file of this patent

UNITED STATES PATENTS

| | | |
|---|---|---|
| 1,445,827 | Fesler | Feb. 20, 1923 |
| 1,593,772 | Litster | July 27, 1926 |
| 2,147,084 | Bouchard | Feb. 14, 1939 |
| 2,276,424 | Siversen et al. | Mar. 17, 1942 |
| 2,670,099 | Dunton | Feb. 23, 1954 |

FOREIGN PATENTS

| | | |
|---|---|---|
| 387,253 | Great Britain | Feb. 2, 1933 |
| 599,165 | Great Britain | Mar. 5, 1948 |